(12) United States Patent
Turnbull (10) Patent No.: US 9,207,346 B2
(45) Date of Patent: Dec. 8, 2015

(54) METHOD AND SYSTEM OF CONTROLLING TOWING SPEED OF A SENSOR STREAMER

(75) Inventor: Neil H. R. Turnbull, Edinburgh (GB)

(73) Assignee: PGS Geophysical AS, Oslo (NO)

( * ) Notice: Subject to any disclaimer, the term of this patent is extended or adjusted under 35 U.S.C. 154(b) by 690 days.

(21) Appl. No.: 13/549,310

(22) Filed: Jul. 13, 2012

(65) Prior Publication Data

US 2014/0016434 A1    Jan. 16, 2014

(51) Int. Cl.
*G01V 1/38* (2006.01)

(52) U.S. Cl.
CPC .......... *G01V 1/3808* (2013.01); *G01V 2210/32* (2013.01)

(58) Field of Classification Search
CPC .......................... G01V 1/3808; G10V 2210/32
USPC .......................................................... 367/21
See application file for complete search history.

(56) References Cited

U.S. PATENT DOCUMENTS

| | | |
|---|---|---|
| 3,398,715 A | 8/1968 | Burg |
| 3,525,072 A | 8/1970 | Born et al. |
| 4,323,876 A * | 4/1982 | Parrack et al. ................. 367/40 |
| 4,992,993 A * | 2/1991 | Chambers ....................... 367/21 |
| 2005/0114097 A1* | 5/2005 | Duncan ............................. 703/1 |
| 2012/0082000 A1 | 4/2012 | Perciot et al. |

FOREIGN PATENT DOCUMENTS

EP    2196827 A2    6/2010

OTHER PUBLICATIONS

European Search Report issued for application No. 13173759.5, mailed Nov. 29, 2013, 7 pages.
Thomas Elboth, "Noise in Marine Seismic Data", Faculty of Mathematics and Natural Sciences, University of Oslo No. 968, May 11, 2010, pp. 1-148.

* cited by examiner

*Primary Examiner* — Daniel L Murphy (57) ABSTRACT

Controlling towing speed of a sensor streamer. At least some of the of the embodiments are methods including: towing a sensor streamer through water at a towing speed; releasing interrogating energy within the water; recording energy received by the sensor streamer to create recorded energy; determining a value indicative of noise within the recorded energy; and changing the towing speed in real-time responsive to the value indicative of noise within the recorded energy.

26 Claims, 6 Drawing Sheets

METHOD AND SYSTEM OF CONTROLLING TOWING SPEED OF A SENSOR STREAMER

BACKGROUND

Marine survey systems are used to acquire data regarding Earth formations below a body of water such as a lake or ocean. The marine survey systems may use a plurality of sensor streamers towed through the body of water, where each sensor streamer receives energy (e.g., acoustic energy) reflected from the Earth formations. Energy received by each sensor streamer contains both signals of interest and noise. If the noise is too high, the data set created by recording the energy incident upon the sensor streamers may be unusable.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean plus or minus five percent (5%) of the recited value.

"Signal region" of a frequency-wavenumber domain shall mean a range of wavenumbers as a function of frequency within which interrogating energy reflected from subsurface structures resides, if any such interrogating energy is present. The signal region also contains noise.

"Real-time", in relation to control of speed of a towing vessel based on noise within measured signals, shall mean that changes in towing speed based on measured signals are implemented within 10 minutes of acquiring the measured signals.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to controlling towing speed of a tow vessel in marine survey operations. More particularly, at least some embodiments are directed to determining an indication of noise in the received signals of a marine survey operation, and controlling towing speed of the tow vessel (and thus sensor streamers) in real-time, the control of towing speed to balance the advantages of increased towing speed against noise in the recorded signals proportional to towing speed. The specification first turns to an illustrative marine survey system to orient the reader, and then to example embodiments.

Figure 1:
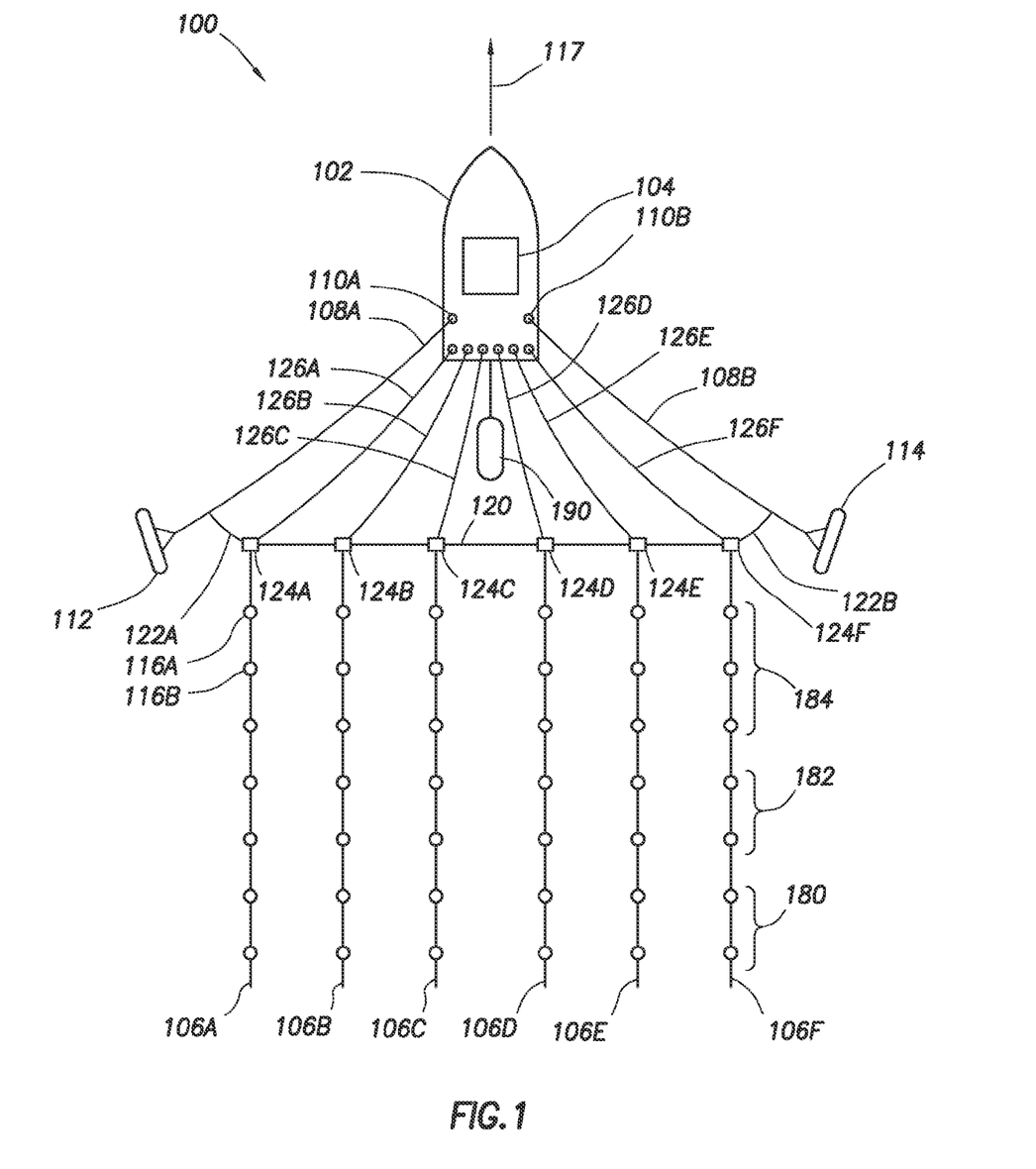
FIG. 1 shows an overhead view of a marine survey system in accordance with at least some embodiments.

FIG. 1 shows an overhead view of a marine survey system 100 in accordance with at least some embodiments. In particular, FIG. 1 shows a survey or tow vessel 102 having onboard equipment 104, such as navigation, energy source control, and data recording equipment. Vessel 102 is configured to tow one or more sensor streamers 106A-F through the water. While FIG. 1 illustratively shows six sensor streamers 106, any number of sensor streamers 106 may be used.

In the example system, the sensor streamers 106 are coupled to towing equipment that maintains the sensor streamers 106 at selected depth and lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120 or, as illustrated, couple to the spreader line by way of spur lines 122A and 122B.

As illustrated, the sensor streamers 106 are each coupled, at the ends nearest the vessel 102 (i.e., the proximal ends), to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the onboard equipment 104 and the sensors (e.g., 116A, 116B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed. The illustrated towing equipment may be used alone or in conjunction with other lateral position and depth control equipment. Other example systems may have more complex or simpler towing arrangements.

Each sensor streamer 106 may comprise an elongated outer jacket defining an interior volume. The elongated outer jacket defines a central axis along the long dimension of the sensor streamer. In the example situation of FIG. 1, the central axis of each sensor streamer is parallel to the direction of travel of the tow vessel 102, the direction of travel indicated by arrow 117. The orientation of sensor streamers 106 in relation to the vessel 102 can change over time (e.g., in response to water currents present in the water, turning of the vessel). The sensors (e.g., 116A, 116B) may reside within the interior volume or on the elongated outer jacket, and the sensors may be longitudinally spaced along each sensor streamer 106. In some embodiments, the sensors 116 are geophones which are sensitive to minute changes in velocity. The geophones may be suspended in a gimbal arrangement such that each geophone is most sensitive to vertical velocity changes (i.e., velocity changes aligned with the force of gravity). In other embodiments, the sensors 116 are hydrophones which are highly sensitive to acoustic energy. In yet still other cases, the sensors 116 may including one or any combination of the following: geophones; hydrophones, accelerometers, solid-state motion sensors (MEMS), multiple component geophones, orientation sensors, and electromagnetic sensors.

Although it may be possible to have the recording equipment 104 record signals from each sensor 116 individually, in some cases the sensors associated with a sensor streamer are logically divided into groups for purposes of recording received signals, such as sensor groups 180, 182, and 184 associated with sensor streamer 106F. In particular, in some cases a plurality of sensors along a sensor streamer are logically grouped together and operate in parallel (as an array) such that a single received signal (i.e., "channel" or "trace") is created based on the contributions of measurements from each sensor in the group. Sensor streamers 106 may each have any length. In an example system the sensor streamers may be between 5 kilometers (km) and 15 km, and each sensor streamer may comprise some 600 or more sensor groups (a sensor group comprising two or more sensors). In an example sensor streamer having a length of 7.5 km, a single group of sensors may span a longitudinal distance of 12.5 meters (m), and thus a single sensor streamer may have 600 sensor groups.

Still referring to FIG. 1, in some situations the tow vessel 102, in addition to towing the sensor streamers 106, may also tow the acoustic source 190. The acoustic source 190 may take any suitable form, such as an air gun-type system. In other cases, however, a separate vessel may tow the acoustic source 190 such that certain predetermined relationships between the physical location of the sensor streamers 106, the underground hydrocarbon bearing formation, and the acoustic source 190 may be achieved.

One aspect of understanding the various example systems is an understanding of why towing speed is an issue. Most if not all commercial marine survey systems, prior to the systems described herein, utilized hydrophones as the main sensing element in the sensor streamers. For received acoustic energy in frequency ranges of interest, hydrophones are relatively insensitive to noise caused by the sensor streamers being towed through the water. That is, there may not be a speed limit associated with towing noise when towing hydrophone-based sensor streamers through the water (though there may be other factors limiting speed, like sensor streamer tension).

However, in accordance with at least some embodiments of the present disclosure, the sensor streamers contain geophones, in some cases gimbaled to be sensitive to vertical velocity. Geophones, being sensitive to minute velocity changes (i.e., the physical up and down movement, as opposed to being sensitive pressure changes as are hydrophone-based systems) are more sensitive than hydrophones to noise caused by the speed at which the sensor streamer is towed through the water. In fact, broadband noise associated with sensor streamers using geophones is approximately related to the third power of the speed that the sensor streamers are towed through the water. Thus, even slight increases in towing speed increase noise significantly. Moreover, sensor streamers using geophones are sensitive to environmental factors, such as barnacle growth that occurs more prevalently in tropical waters. It follows that a towing speed for a geophone-based sensor streamer that works well in arctic waters may be too fast for tropical waters where barnacle growth has occurred. Moreover, as barnacle growth continues over time, an initial towing speed that provides a good tradeoff between towing speed and noise may later be too fast.

A similar relationship between recorded noise and towing speed is also present in hydrophone-based sensor streamers when the frequency ranges of interest are very low. That is, for hydrophone-based sensor streamers where the signal frequencies of interest are sufficiently low that mechanical vibrations of the streamers are the dominant noise source, even the hydrophone-based sensor streamers are susceptible to noise associated with towing speed.

In order to at least partially address concerns regarding towing speed induced noise, in the various embodiments towing speed of the tow vessel is controlled responsive to an amount of noise detected in signal generated by sensors in the streamers. In particular, the various embodiments are directed to towing sensor streamers through the water at a towing speed. Simultaneously with the towing, interrogating energy is released from the acoustic source 190 (the releasing, and subsequent data collection, being referred to in some cases as a "shot"). Within a time window after the release of interrogating energy from the acoustic source 190, energy incident upon the sensor streamers is recorded. The length of the time window within which data is recorded is based on many factors, such as depth of the target hydrocarbon bearing formation, depth of the water, desired record length, and speed of the tow vessel. For an illustrative towing speed of about 5 knots (approximately 2.5 meters per second), the time window may be on the order of about 7.5 seconds for a record length covering about 18.75 meters traveled. Again for an illustrative towing speed of about 5 knots, the time window may be on the order of about 15 seconds for a record length covering about 37.5 meters traveled. Thus, a shot may comprise release of acoustic energy, and then a recording time of about 7.5 seconds to about 15 seconds (depending on the various factors). In most cases, as soon as the time window expires, another release of acoustic energy occurs and the process repeats.

Based on the data associated with each shot, a noise value (as opposed to signal of interest) in the recorded energy is determined. Various examples of calculating the noise value in the recorded energy are discussed in greater detail below. Regardless of the precise mechanism for calculating the noise value, the noise value may be used, alone or in combination with previous noise values, as a feedback parameter to control speed. For example, the noise value for the most recent shot, as well as the noise values for a predetermined number of previous shots, may be combined (e.g., averaged). If the noise value is above a predetermined threshold, the speed of the tow vessel may be reduced in an attempt to reduce the noise. Likewise, if the noise value is below a predetermined threshold, the speed of the tow vessel may be increased to reduce the overall time used to perform the survey, and thus to reduce the cost.

Control of the speed of the tow vessel may take many forms. In some cases, speed of the tow vessel may be controlled automatically. That is, a computer system associated with the onboard equipment 104 may directly control, without human intervention, the speed of the tow vessel. In other cases, a computer system associated with the onboard equipment 104 may produce a visual indication of the ongoing relationship between noise and towing speed, and a human operator may implement changes in towing speed based on the information received. Regardless of how the speed control is physically implemented, the system may control towing speed to balance the advantages of increased towing speed while ensuring that the recorded data is sufficient for analysis. The specification now turns to examples of determining noise values.

In example embodiments, a noise value is determined or calculated for each sensor streamer for each shot. Consider then, for purposes of explanation, a single shot and a corresponding set of data associated with a sensor streamer comprising a plurality of geophone groups, the data recorded in an overall time window associated with the release of acoustic energy. In accordance with at least some embodiments, the noise value is based on a subset of data taken from a smaller time window (hereafter the noise window) within the overall time window. Stated otherwise, the noise value may be calculated based on a restricted time-offset (t-x) window. More particular, in some cases the noise value may be based on data recorded in a noise window having time length between and including 500 milliseconds (ms) and 1000 ms taken from second half of the overall time window, and in some cases the noise window being the last 500 ms to 1000 ms of the overall time window. In other cases, the data set associated with any portion of, or the entire, overall time window may be used to determine the noise value.

In order to reduce edge effects, in some cases data within the noise window is tapered. To describe the tapering, consider that the energy incident upon the sensor streamer is recorded in analog format so that later processing can determine not only the arrival time, but also the amplitude and frequency of incident energy. To implement tapering, the amplitude of the recoded energy in the noise window may be adjusted to "ramp up" from at or near zero to actual recorded energy amplitudes at the beginning of the noise window, and likewise "ramp down" at the end of the noise window. Tapering may reduce effects associated with abrupt changes when the data is subjected to Fourier transformation (i.e., reduce presence of high frequency components in the frequency domain attributable to the abrupt or step changes in the data).

Next, the illustrative system performs preprocessing to eliminate spatially localized high-amplitude noise, such as noise associated with depth control devices and or sensor streamer lateral positioning devices. Any of a variety of systems/methods may be used, but at the high level the preprocessing compares traces (each trace being a recorded signal from a sensor group) against other traces, and identifies traces with unexpectedly high root mean square (RMS) energy within predetermined frequency ranges, the high RMS energy as compared to the related traces. For traces thus identified, the values within the trace are interpolated based on the related traces to reduce the localized high amplitude noise.

Figure 2:
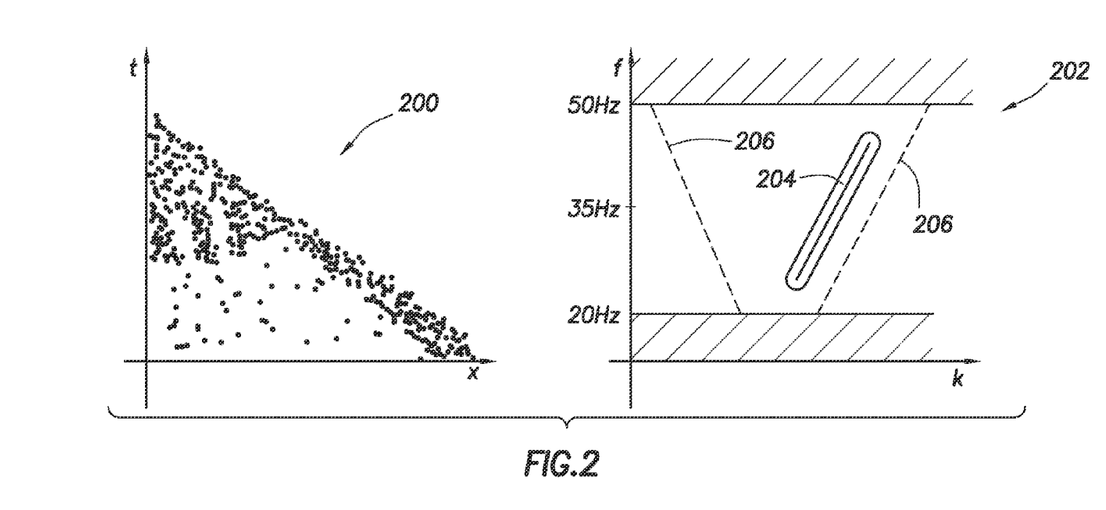
FIG. 2 shows a set of plots (i.e., a t-x plot and a f-k plot) of data in accordance with at least some embodiments.

Next, the illustrative data may be transformed into the frequency domain for further processing. In particular, FIG. 2 shows two plots to highlight the time-domain data as well as the data after transformation into the frequency domain. The left plot 200 graphically shows the data from an example noise window for a single channel of a sensor streamer, the data plotted as time-offset (t-x) data. That is, each point is plotted based on the arrival time of the incident energy and arrival location (i.e., offset). An additional dimension may also be plotted in the form of color of the plotted point indicating amplitude of the incident energy, but such is not shown in FIG. 2 so as not to unduly complicate the figure.

The right plot 202 graphically shows data for a whole gather (i.e., all the channels of a sensor streamer for a single shot) as frequency-wavenumber (f-k) data (i.e., in the f-k domain or f-k space). That is, plot 202 illustrates data based on frequency of the incident energy and wavenumber (i.e., cycles per meter) for the sensor streamer. In practice, each datum is plotted as a point based on the frequency and wavenumber, and the individual points considered as a group show patterns. Further in practice, an additional dimension may also be plotted in the form of color of each plotted point indicating amplitude of the incident energy. However, so as not to unduly complicate plot 202 of FIG. 2, various regions of average value are identified by solid lines rather than individual plotted points. In the example situation of plot 202 of FIG. 2, energy below about 20 Hz and above about 50 Hz is excluded for the purpose of subsequent noise measurement, and so in plot 202 the regions below about 20 Hz and above about 50 Hz are cross-hatched to indicate substantially no data. Between about 20 Hz and about 50 Hz, a substantial amount of data may be present, the data representing both noise and signal. In the illustrative plot 202 of FIG. 2, an example desired signal is shown by enclosed region 204. That is, the data associated with closed region 204 represents signals of interest for seismic exploration (e.g., returning acoustic energy after reflection from a subsurface boundary).

Before proceeding, it is noted that the frequency range of the energy shown in the f-k plot 202 of FIG. 2 is merely illustrative. Depending on a variety of factors (e.g., type of energy source, target formation, water depth, sensor towing depth, water temperature) the frequency range of interest may be different than that shown in plot 202 of FIG. 2. In fact, in some cases (e.g., hydrophone-based sensor streamers) the frequency range of interest may be 5 Hz and below, and yet the example methods may still be applied. Thus, the example situation presented in FIG. 2 shall not be read as a limitation of the applicability of the various embodiments.

Towing noise is, in most cases, broadband in f-k space. That is, noise spans most if not all the frequency range of interest as well as most if not all of the wavenumber range of interest. In some cases the energy distribution is weighted towards the lower frequencies, but uniform in wavenumber. In the illustrative case of plot 202 of FIG. 2, noise spans the 20 Hz to 50 Hz frequency range, and also the entire wavenumber range. The signals of interest for seismic exploration, by contrast, are limited to a range of frequencies as a function of wavenumber, with the span of the wavenumbers increasing with increasing frequency. In the example plot 202 of FIG. 2, the data of interest for seismic exploration fall within an inverted "acoustic cone" as show by dashed lines 206. That is, data that resides within the acoustic cone may comprise both noise and acoustic signals of interest (e.g., data associated with closed region 204), and data residing in the evanescent region (i.e., outside the acoustic cone) is substantially only noise. At the lower end of the frequency range of interest (about 20 Hz) the acoustic cone may span roughly 33% of the wavenumbers. For a streamer with an example 12.5 m group interval, at the upper end of the frequency range under consideration (about 50 Hz) the acoustic cone may span about 83% of the wavenumbers. Smaller group interval length may result in "wider" total wavenumber range such that the acoustic cone occupies a proportionally smaller fraction of wavenumbers in f-k space.

Figure 3:
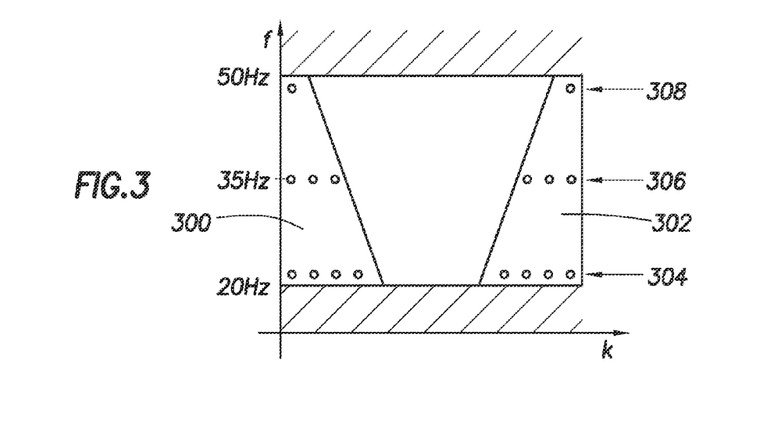
FIG. 3 shows a f-k plot after removal of data within an acoustic cone in accordance with at least some embodiments.

In accordance with an example system, the noise value is calculated based on a restricted set of data from the f-k data. More particularly, a filter may be applied in the f-k data to reject data within the acoustic cone 206. The result of applying the filter in the f-k is shown graphically in the plot of FIG. 3. Much like plot 202 of FIG. 2, FIG. 3 is a simplification that shows regions of interest by solid lines and/or cross-hatch; in practice, however, the plot of FIG. 3 is created by a myriad of individually plotted points which, by virtue of groupings of locations in f-k (or lack of groupings in some cases), defining the various regions. After application of the filter applied in the f-k data to arrive at the example FIG. 3, two illustrative regions 300 and 302 remain, which will be referred to as "triangular regions", though the shape of each region in FIG. 3 may be more properly described as semi-triangular. The shape of the regions 300 and 302 may take any suitable form, and thus reference to "triangular regions" is merely for convenience and shall not be construed to limit the shape of the regions 300 and 302 or the shape of the signal region. The triangular regions 300 and 302 represent noise in the recorded data for the channels of the sensor streamer; however, the data within the (now removed) acoustic cone represented both signal and noise, and thus application of the filter not only removes the signals (if any), but also some of the noise. In order to arrive at a noise value across relevant wavenumbers and relevant frequencies, the noise that resided within the acoustic cone is taken into account. The following paragraphs discuss examples of taking into account noise that resided in the acoustic cone.

In accordance with example embodiments, estimating the noise amplitude (including the noise removed from the acoustic cone) is based on the noise in the triangular regions 300 and 302 for each frequency. In particular, at each frequency within the f-k data the proportion of wavenumbers removed or rejected by the f-k filter is calculated. The noise energy is assumed to be uniformly distributed with respect to wavenumber, so the reciprocal of the proportion of wavenumbers rejected is, in some cases, the corrective scalar applied in order to estimate the total noise energy across the entire wavenumber range from the noise energy measured only in the triangular regions. Thus, a corrective scalar is derived for each frequency.

In order to illustrate estimating the corrective scalars, FIG. 3 illustratively contains a small set of plotted points logically divided into horizontal groupings of points 304, 306, and 308. That is, grouping of points 304 is illustrative of data having the same frequency (in this example, about 20 Hz) with varying wavenumber. Grouping of points 306 is illustrative of data having the same frequency (in this example, about 35 Hz) with varying wavenumber. Likewise, grouping of points 308 is illustrative of data having the same frequency (in this example, about 50 Hz) with varying wavenumber. In practice, each grouping may contain many hundreds or thousands of points, but the example groupings have a smaller number so as not to unduly complicate the figure and/or the discussion.

In the example grouping of points 304 there are eight points spanning a limited range of wavenumbers. Based on the breadth of the acoustic cone in f-k space at the example frequency, approximately 33% of the data along the 20 Hz frequency resided within the acoustic cone and has been removed. Thus, the corrective scalar for the example 20 Hz frequency in this example is about 1.5 (that is, 67% remains, and thus corrective scalar=1/0.67=1.49). In the example grouping of points 306 there are six points spanning a limited range of wavenumbers. Based on the breadth of the acoustic cone in f-k space at the example frequency, approximately 58% of the data along the 35 Hz frequency resided within the acoustic cone and has been removed. Thus, the corrective scalar for the example 35 Hz frequency in this example is about 2.4 (that is, 42% remains, and thus corrective scalar=1/0.42=2.38). In the example grouping of points 308 there are two points spanning a limited range of wavenumbers. Based on the breadth of the acoustic cone in f-k space at the example frequency, approximately 83% of the data along the 50 Hz frequency resided within the acoustic cone and has been removed. Thus, the corrective scalar for the example 50 Hz frequency in this example is about 5.9 (that is, 17% remains, and thus corrective scalar=1/0.17=5.88). Although only three groupings of points are discussed with respect to FIG. 3, it should be understood that the illustrative method is performed for a plurality of discrete frequencies, with a corrective scalar determined for each discrete frequency.

In accordance with example embodiments, application of the corrective scalar is performed in the frequency-offset domain (i.e., in the f-x domain or f-x space). That is, once the set of the corrective scalars is determined as discussed above, the data within the triangular regions 300 and 302 is transformed to the f-x space. For each frequency within the f-x space, energy at the example frequency is scaled up to account for the missing data at that frequency. Stated otherwise, the noise energy at each frequency is increased based on the corrective scalar for that respective frequency to account for the noise removed by application of the filter in the f-k domain. A value indicative of noise is then created for each channel by taking the RMS amplitude over the channel in question, with appropriate normalization for windowing and tapering.

The discussion to this point has been based on calculating a noise value for each channel associated with a sensor streamer for a single shot (hereafter "channel noise value"). The channel noise values for all channels on a sensor streamer may be combined to obtain a noise value for the sensor streamer (hereafter "streamer noise value"). In one example embodiment, all the channel noise values are combined (e.g., averaged) to arrive at the streamer noise value. In another example embodiment, a smaller subset of the channels noise values may be combined. For example, in some cases the channel noise values are ranked according to the RMS value of the noise, and from the ranking channel noise values within a predetermined range (e.g., $40^{th}$ to $80^{th}$ percentile based and RMS amplitude) are averaged and the remaining channels are discarded. Taking a smaller subset of the channel noise values of may act to exclude from the calculation local anomalies associated with the streamer (e.g., large noise bursts associated with tangled fishing gear).

With streamer noise values for a particular shot calculated, much information may be determined. For example, in some cases the streamer noise values for each shot may be plotted on a scatter diagram having an axis that defines streamer identification (e.g., streamer number), an axis that defines shot number, and with an indication of the noise value depicted in a color coding of the plotted point. From such a drawing, an operator may deduce which portions of the sensor streamer spread are limiting overall speed. For example, such a plot may show which sensor streamer or streamers have become entangled with each other and/or with other objects (such as discarded fishing lines).

Moreover, in the example situation the individual streamer noise values may be combined to create a noise value for the overall streamer spread (hereafter "full-spread noise value"). For example, in some cases the streamer noise values for a shot are averaged to arrive at the full-spread noise value for the shot.

The discussion to this point has assumed determining a full-spread noise value based on calculations in reduced t-x and f-k space, and estimating the noise taking into account removal of data associated with the acoustic cone; however, such a method to arrive at a full-spread noise value is merely illustrative. Other methods and systems for arriving at a full-spread noise value may be used in other situations. For example, acoustic signal of interest (i.e., acoustic energy returning after reflecting from subsurface structures) is coherent energy; whereas, towing noise is incoherent (i.e., random in space on the scale of the group interval and in the frequency range under consideration). Thus, in other example embodiments a full-spread noise value may be determined by removing data corresponding to coherent energy (e.g., by performing predictive modeling or statistical correlation on the data), and then calculating the RMS value of the remaining data after removal of the data representing coherent energy.

Figure 4:
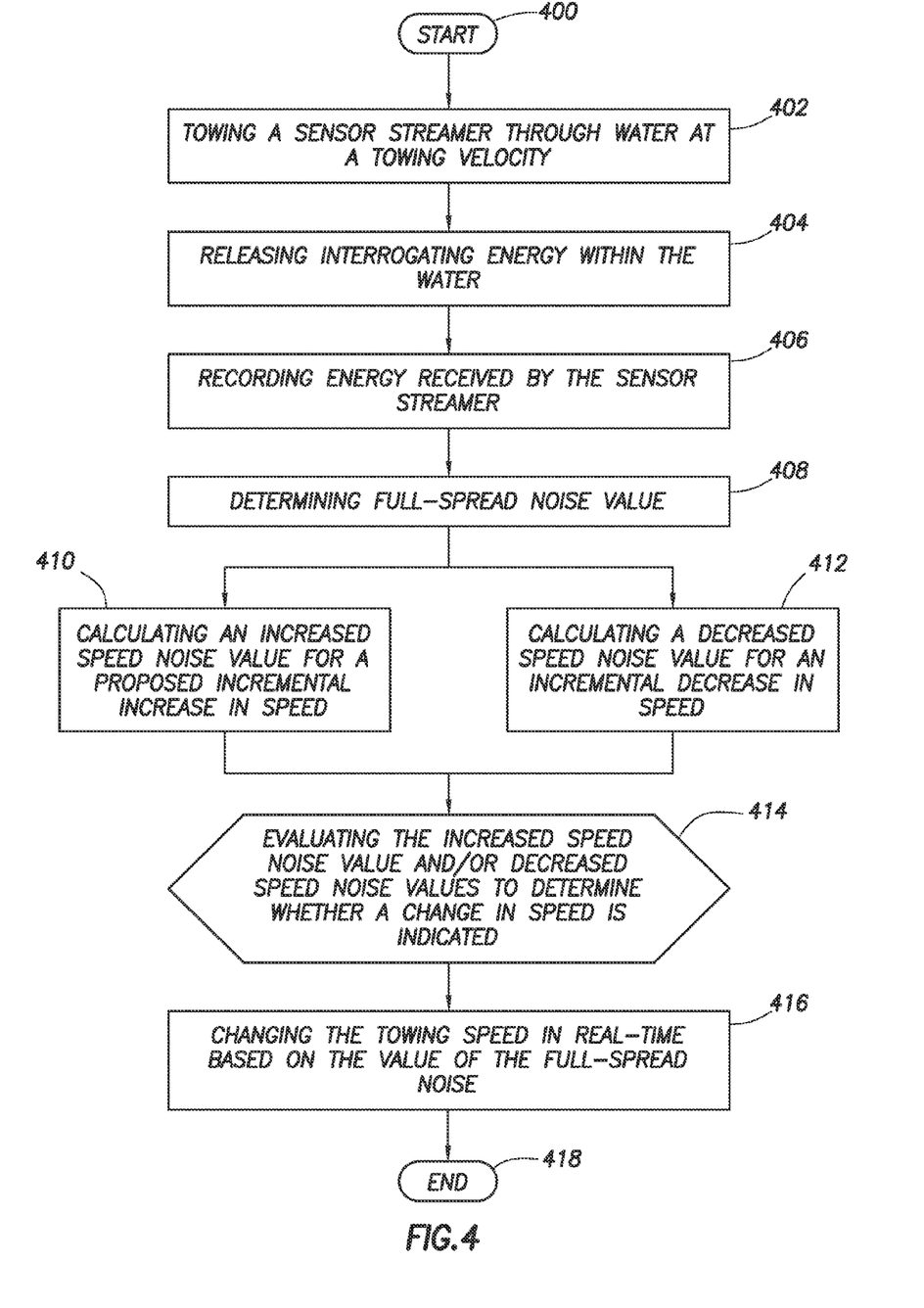
FIG. 4 shows a flow diagram in accordance with at least some embodiments.

FIG. 4 shows an example method for evaluating and/or changing vessel speed as a function of full-spread noise values. In particular, the method starts (block 400) and comprises towing a sensor streamer through water at a towing speed (block 402). During the towing, the method may comprise releasing interrogating energy within the water (block 404). In a time window associated with the releasing of the interrogating energy, the method further comprises recording energy received by the sensor streamer (block 406). Based on the recorded energy a full-spread noise value is determined (block 408). In some cases, the full-spread noise value is calculated using one of the example systems/methods discussed above.

Based on the full-spread noise value and the current speed of the tow vessel, and further based on the knowledge that the noise is related to the third power of the speed, an increased speed noise value for a proposed incremental increase in speed (e.g., 0.5 knots) may be determined (block 410). Likewise, a decreased speed noise value for an incremental decrease in speed (e.g., 0.5 knots) may be determined (block 412). It is noted that the determining increased or decreased speed noise values is optional, and either or both may be omitted. If the spread noise is below a predetermined threshold, calculating the decreased speed noise value may be omitted. Likewise, if the spread noise is above the predetermined threshold, calculating the increased speed noise value may be omitted. In other cases, particularly cases where speed changes are made programmatically, based on the relationship between noise and speed the system may calculate a precise speed to be used.

The illustrative method may then comprise evaluating the increased speed noise value and/or the decreased speed noise values to determine whether a change in speed is indicated (block 414). For example, if the full-spread noise value is below a predetermined threshold, and the increased speed noise value is likewise below the predetermined threshold, then speed of the tow vessel may be increased (either automatically, or by the operator). Likewise, if the full-spread noise value is above a predetermined threshold, and the decreased speed noise value is below the predetermined threshold, then speed of the tow vessel may be decreased (either automatically, or by the operator). Thus, if needed, the method may comprise changing the towing speed in real-time based on the value of the spread noise (block 416), and then the illustrative method ends (block 418), likely to be immediately re-started.

Figure 5:
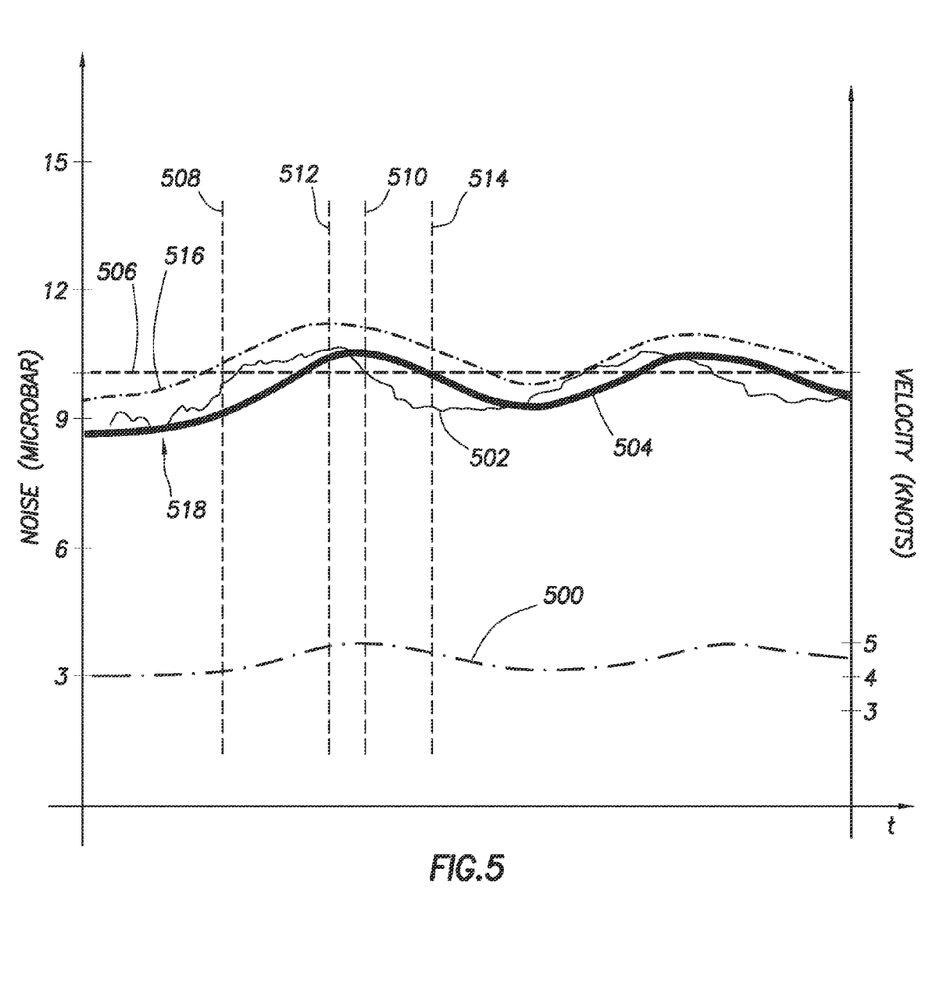
FIG. 5 shows a plot provided to a vessel operator in accordance with at least some embodiments.

In cases where an operator makes the final decision regarding changing speed of the vessel, a computer system associated with the onboard equipment 104 may provide a visual representation of the state of the system from a noise and speed perspective. FIG. 5 shows an example plot that may be provided to an operator and from which decisions regarding changes in speed of the tow vessel may be made. In particular, FIG. 5 is a dual plot, where the left Y-axis is noise (illustratively in microbars, or in an equivalent unit for sensors other than hydrophones), the right Y-axis is speed (knots) and the X-axis is time (or, equivalently, shot number). The lower dash-dot-dash line 500 plots an illustrative speed as a function of time in the example situation, shown to be between 4 and 5 knots. In the example embodiment, each full-spread noise value (that is, the calculated full-spread noise value per shot) is plotted as shown in the smaller solid line 502). In some cases, tow vessel speed control may be based on the full-spread noise value per shot directly. Thus, as the "instantaneous" full-spread noise values (i.e., per shot full-spread noise) increase above a predetermined threshold (e.g., horizontal dashed line 506), such as at time point 508, tow vessel speed may be decreased in this example. In other cases, when the instantaneous full-spread noise values decreases below the predetermined threshold 506, such as time point 510, tow vessel speed may be increased in this example.

In yet still further embodiments, however, the tow vessel speed control may be based on a rolling average spread noise to avoid changes in tow vessel speed that may be based on localized noise in a shot where the noise is not necessarily indicative of a long term trend. For example, the thicker solid line 504 represents the rolling average full-spread noise value over some predetermined time (e.g., the average of the full-spread noise values over the last ten shots). The rolling average full-spread noise value is thus less sensitive to localized noise, and may better identify trends in the overall noise data. Thus, as the "average" full-spread noise value (i.e., over several shots) increases above the predetermined threshold 506, such as time point 512, tow vessel speed may be decreased in this example. In other cases, when the average full-spread noise value decreases below the predetermined threshold 506, such as time point 514, tow vessel speed may be increased in this example.

In yet still further cases, the operator may be presented with information that predicts noise at increased speed. In particular, the example plot of FIG. 5 comprises upper dashed-dot-dashed line 516. Line 516 may present to the operator an expected noise value if the vessel speed was increased by a predetermined amount (e.g., 0.5 knots). Thus, at the example point in time 518, the dash-dot-dash line 516 may convey to the operator that an increase in speed of 0.5 knots may be implemented while still keeping the noise value below the predetermined threshold 506. A similar plotted line may be presented to predict noise values at reduced speed, but such is not included in FIG. 5 so as not to further complicate the figure. Thus, an operator viewing FIG. 5 may note the instantaneous noise values and average noise values as they are plotted, and may implement speed changes (in some cases the magnitude of the speed changes informed by indications of predicted noise).

The inventor of the present specification has determined that implementation of the various embodiments may result in speed increases of about 10% in marine surveys in arctic and temperate waters (e.g., an increase from about 4.7 knots to 5.15 knots). Because of barnacle build-up, speed increases may be less pronounced in tropical water, but the systems and/or methods enable early identification of barnacle buildup such that speed decreases may be implemented to preserve the integrity of the recorded data, or as a trigger to perform barnacle cleaning operations. Regardless of whether the water is arctic or tropical, when sea conditions are less than ideal (e.g., storms, high swells), the various embodiments may enable continued surveying, at reduced speed as indicated by the noise values, where in other situations the surveying operations may otherwise have ceased based on the weather and/or sea conditions.

Figure 6:
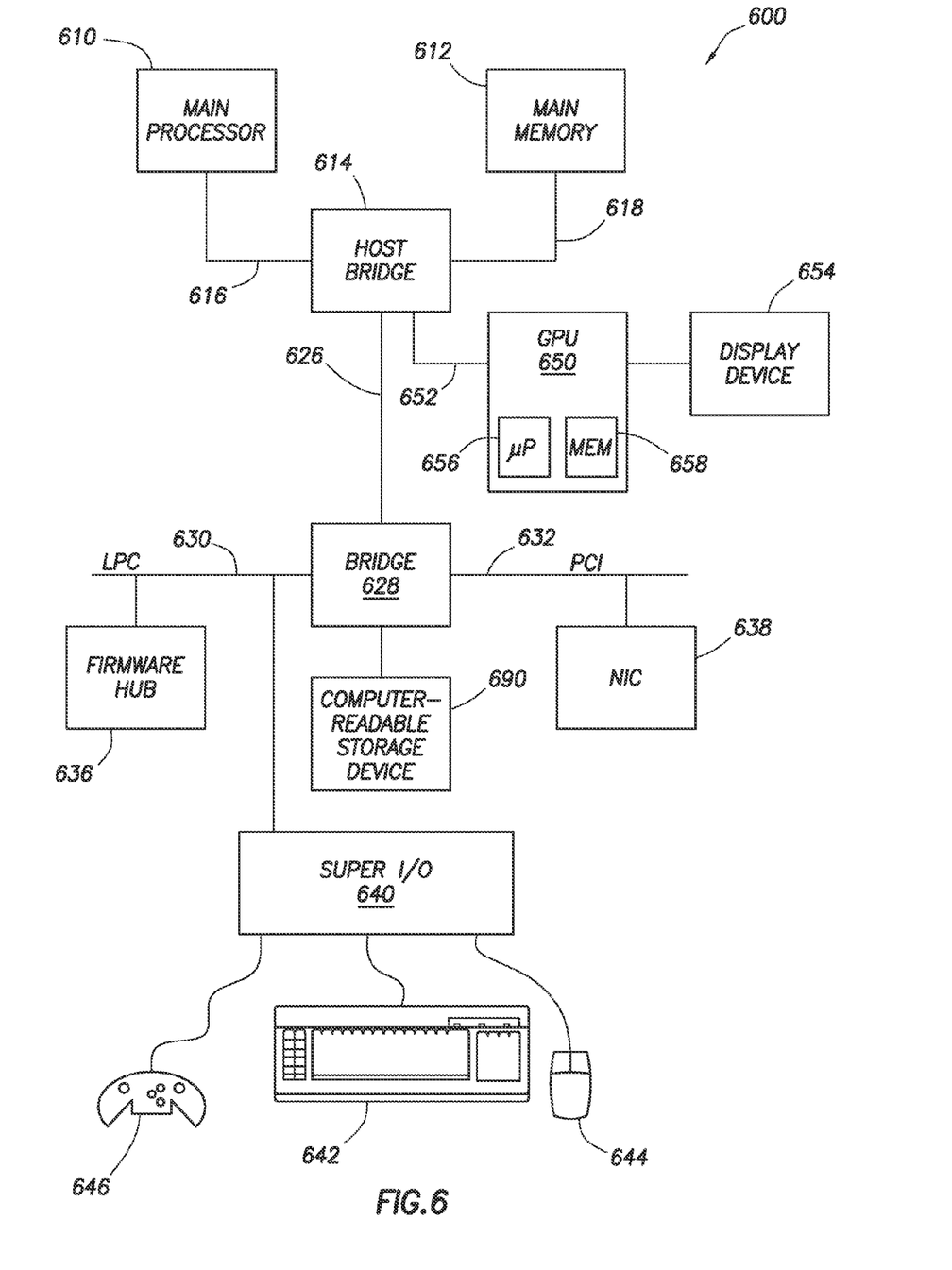
FIG. 6 shows a computer system in accordance with at least some embodiments.

FIG. 6 illustrates a computer system 600 as one example of any number of computing devices that may be used to implement at least some embodiments. Any or all of the embodiments that involve calculating noise values (whether with respect to a channel, a sensor streamer, or the entire sensor streamer spread) may be implemented, in whole or in part, on a computer system such as that shown in FIG. 6, or after-developed computer systems. Moreover, any or all the embodiments that involve computer-based control of tow vessel speed and/or providing a visual indication of noise and speed may be implemented, in whole or in part, on a computer system such as that shown in FIG. 6, or after-developed computer systems. Thus, a computer system such as computer system 600, or multiple computer systems such as computer system 600, may be part of the onboard equipment 104.

Computer system 600 comprises a main processor 610 coupled to a main memory array 612, and various other peripheral computer system components, through integrated host bridge 614. The main processor 610 may be a single processor core device, or a processor implementing multiple processor cores. Furthermore, computer system 600 may implement multiple main processors 610. The main processor 610 couples to the host bridge 614 by way of a host bus 616, or the host bridge 614 may be integrated into the main processor 610. Thus, the computer system 600 may implement other bus configurations or bus-bridges in addition to, or in place of, those shown in FIG. 6.

The main memory 612 couples to the host bridge 614 through a memory bus 618. Thus, the host bridge 614 comprises a memory control unit that controls transactions to the main memory 612 by asserting control signals for memory accesses. In other embodiments, the main processor 610 directly implements a memory control unit, and the main memory 612 may couple directly to the main processor 610. The main memory 612 functions as the working memory for the main processor 610 and comprises a memory device or array of memory devices in which programs, instructions and data are stored. The main memory 612 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 612 is an example of a non-transitory computer-readable medium storing programs and instructions, and other examples are disk drives and flash memory devices (e.g., computer-readable storage device 690).

The illustrative computer system 600 also comprises a second bridge 628 that bridges the primary expansion bus 626 to various secondary expansion buses, such as a low pin count (LPC) bus 630 and peripheral components interconnect (PCI) bus 632. Various other secondary expansion buses may be supported by the bridge device 628.

Firmware hub 636 couples to the bridge device 628 by way of the LPC bus 630. The firmware hub 636 comprises read-only memory (ROM) which contains software programs executable by the main processor 610. The software programs comprise programs executed during and just after power on self-test (POST) procedures as well as memory reference code. The POST procedures and memory reference code perform various functions within the computer system before control of the computer system is turned over to the operating system. The computer system 600 further comprises a network interface card (NIC) 638 illustratively coupled to the PCI bus 632. The NIC 638 acts to couple the computer system 600 to a communication network, such the Internet, or local- or wide-area networks.

Still referring to FIG. 6, computer system 600 may further comprise a super input/output (I/O) controller 640 coupled to the bridge 628 by way of the LPC bus 630. The Super I/O controller 640 controls many computer system functions, for example interfacing with various input and output devices such as a keyboard 642, a pointing device 644 (e.g., mouse), a pointing device in the form of a game controller 646, various serial ports, floppy drives and disk drives. The super I/O controller 640 is often referred to as "super" because of the many I/O functions it performs.

The computer system 600 may further comprise a graphics processing unit (GPU) 650 coupled to the host bridge 614 by way of bus 652, such as a PCI Express (PCI-E) bus or Advanced Graphics Processing (AGP) bus. Other bus systems, including after-developed bus systems, may be equivalently used. Moreover, the graphics processing unit 650 may alternatively couple to the primary expansion bus 626, or one of the secondary expansion buses (e.g., PCI bus 632). The graphics processing unit 650 couples to a display device 654 which may comprise any suitable electronic display device upon which any image or text can be plotted and/or displayed—such as the plots of noise and speed discussed with respect to FIG. 5. The graphics processing unit 650 may comprise an onboard processor 656, as well as onboard memory 658. The processor 656 may thus perform graphics processing, as commanded by the main processor 610. Moreover, the memory 658 may be significant, on the order of several hundred megabytes or more. Thus, once commanded by the main processor 610, the graphics processing unit 650 may perform significant calculations regarding graphics to be displayed on the display device, and ultimately display such graphics, without further input or assistance of the main processor 610.

Figure 7:
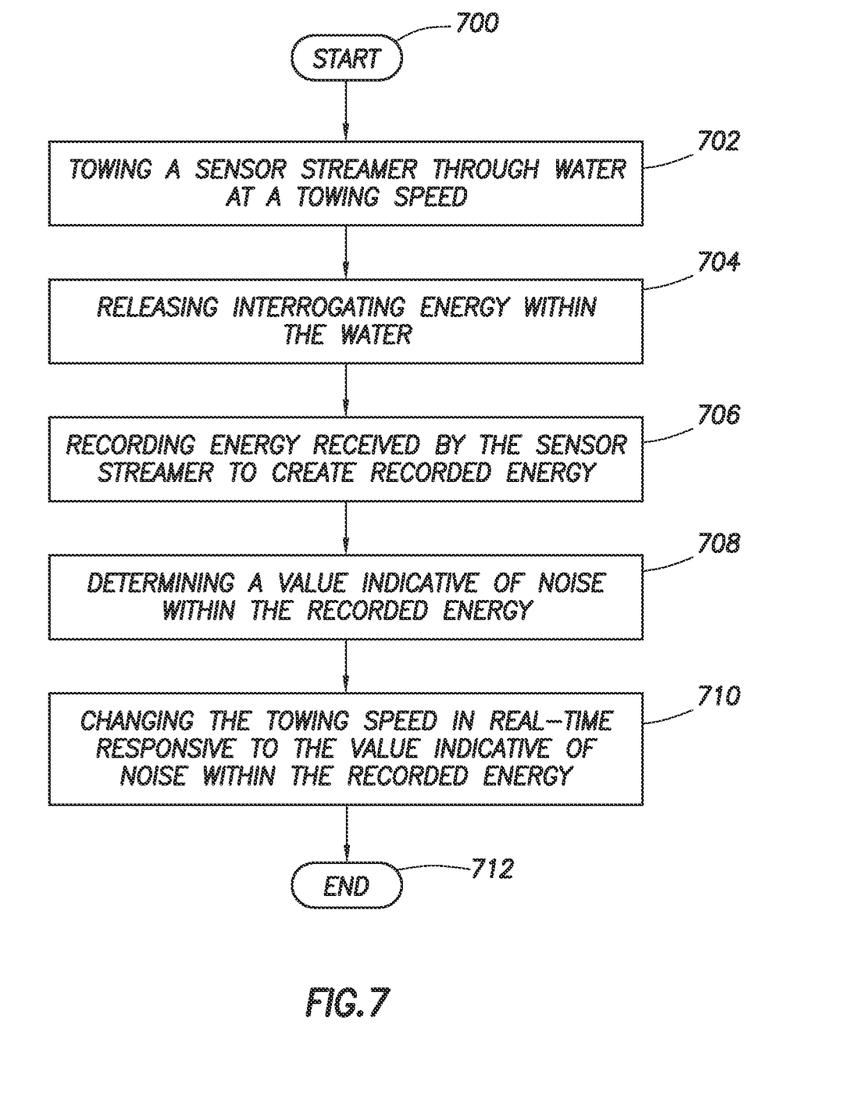
FIG. 7 shows a method in accordance with at least some embodiments.

FIG. 7 shows a method in accordance with at least some embodiments. In particular, the method starts (block 700) and comprises towing a sensor streamer through water at a towing speed (block 702). The method further comprises releasing interrogating energy within the water (block 704) and recording energy received by the sensor streamer to create recorded energy (block 706). The method may then comprise determining a value indicative of noise within the recorded energy (block 708). In some cases, the value indicative of noise may be the full-spread noise value. In other cases, the value indicative of noise may be the noise associated with a noisiest grouping of sensors of the sensor streamer. In still further cases, the value indicative of noise may be noise associated with a predetermined grouping of sensors of the sensor streamer (though not necessarily the noisiest). As a final example, the value indicative of noise may be computed based on noise values in two or more groupings of sensors of the sensor streamer. Regardless of how the value indicative of noise is calculated, the method may then comprise changing the towing speed in real-time responsive to the value indicative of noise within the recorded energy (block 710). Thereafter the method ends (block 712), in most cases to be immediately restarted.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment", "an example embodiment" and "some embodiments" indicate that a particular element or characteristic is included in at least one embodiment of the invention. Although the phrases "one embodiment", "an embodiment", "a particular embodiment", "an example embodiment" and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

I claim:

1. A method comprising:
   towing a sensor streamer through water at a towing speed;
   releasing interrogating energy within the water;
   recording energy received by the sensor streamer to create recorded energy;
   determining a value indicative of noise within the recorded energy; and
   changing the towing speed in real-time responsive to the value indicative of noise within the recorded energy;
   wherein determining the value indicative of noise further comprises:
      converting the recorded energy into a frequency-wavenumber (f-k) domain;
      removing from a signal region of the f-k domain both the signal and noise data thereby creating a remaining portion; and then
      calculating the value indicative of the noise based on the remaining portion.

2. The method of claim 1 wherein determining the value indicative of noise further comprises at least one selected from the group consisting of: determining a value indicative of a noise over the entire sensor streamer; determining a value indicative of noise of a noisiest grouping of sensors of the sensor streamer; determining a value indicative of noise of a predetermined grouping of sensors of the sensor streamer; and
   determining a value indicative of noise that is computed based on noise values in two or more groupings of sensors of the sensor streamer.

3. The method of claim 1 wherein changing the towing speed further comprises:
   creating a visual indication of noise within the recorded energy; and
   changing the towing speed responsive to the visual indication of noise.

4. The method of claim 1 wherein changing the towing speed further comprises changing the towing speed without human intervention.

5. The method of claim 1:
   wherein recording energy further comprises recording energy in a first time window associated with releasing the interrogating energy; and
   wherein determining the value indicative of noise further comprises determining based on a portion of the recorded energy in the first time window.

6. The method of claim 5 wherein determining further comprises determining based on a portion of the recorded energy in a second half of the first time window.

7. The method of claim 5 wherein determining further comprises determining based on a portion of the recorded energy in a second time window within the first time window, the second time window having a time length shorter than the first time window, the time length of the second time window between and including 500 milliseconds (ms) and 1000 ms.

8. The method of claim 7 further comprising tapering the second time window by at least one selected from the group consisting of: at the beginning of the second time window; at the end of the second time window; and at both the beginning and the end of the second time window.

9. The method of claim 1 wherein calculating the value indicative of noise further comprises:
   for each frequency of a plurality of frequencies, estimating noise energy in the signal region based on noise energy in the remaining portion; and
   determining the value indicative of noise across both the signal region and remaining portion.

10. The method of claim 1 wherein changing the towing speed further comprises at least one selected from the group consisting of: increasing the towing speed based on the value indicative of noise being below a predetermined threshold; and
    decreasing the towing speed based on the value indicative of noise being above a predetermined threshold.

11. A system comprising:
    a tow vessel;
    a sensor streamer defining a proximal end and a distal end, the sensor streamer coupled to the tow vessel by way of the proximal end;
    a computer system comprising a processor coupled to a memory, the computer system aboard the tow vessel and communicatively coupled to the sensor streamer;
    the memory storing a program that, when executed by the processor of the computer system, causes the processor to:
       record signals received by the sensor streamer to create recorded signals;
       convert the recorded signals into a frequency-wavenumber (f-k) domain;
       remove from a signal region of the f-k domain both the signal and noise data thereby creating a remaining portion; and then
       calculate a value indicative of noise based on the remaining portion; and
       plot on a display device the value indicative of noise.

12. The system of claim 11 wherein the program further causes the processor to plot on the display device an indication of predicted noise at a towing speed different than a current towing speed.

13. The system of claim 11:
wherein the program causes the processor to read signals in a first time window associated with releasing of interrogating energy; and
wherein when the processor calculates, the program causes the processor to calculate based on a portion of the signals in a second half of the first time window.

14. The system of claim 11:
wherein the program causes the processor to read signals in a first time window associated with releasing of interrogating energy; and
wherein when the processor calculates, the program causes the processor to calculate based on a second time window within the first time window, the second time window having a time length between and including 500 milliseconds (ms) and 1000 ms.

15. The system of claim 14 wherein the program further causes the processor to taper the second time window by at least one selected from the group consisting of: at the beginning of the second time window; at the end of the second time window; and at both the beginning and the end of the second time window.

16. The system of claim 11 wherein when the processor calculates the value indicative of noise, the program causes the processor to:
for each frequency of a plurality of frequencies, estimate noise energy in the signal region based on noise energy in the remaining portion; and
determine the value indicative of noise across both the signal region and the remaining portion.

17. The system of claim 11 wherein the sensor streamer further comprises a plurality of sensors spaced apart along the sensor streamer, the sensors comprising at least one selected from the group consisting of: geophones; and hydrophones.

18. The system of claim 11 wherein the program further causes the processor to change towing speed of the tow vessel based on the value indicative of noise within the recorded signals.

19. The system of claim 11 wherein the program further causes the processor to:
create a visual indication of noise within the recorded energy on a display device; and
change the towing speed by a responsive to the visual indication of noise.

20. The system of claim 11 wherein the program further causes the processor to change the towing speed without human intervention.

21. The system of claim 11 wherein when the processor changes towing speed, the program causes the processor to at least one selected from the group consisting of: increase the towing speed based on the value indicative of noise being below a predetermined threshold; and decrease the towing speed based on the value indicative of noise being above a predetermined threshold.

22. A non-transitory computer-readable medium storing a program that, when executed by a processor, causes the processor to:
record energy received by a sensor streamer towed by a tow vessel to create recorded energy;
convert the recorded signals into a frequency-wavenumber (f-k) domain;
remove from a signal region of the f-k domain both the signal and noise data thereby creating a remaining portion; and then
calculate a value indicate of noise based on the remaining portion; and
change towing speed of the tow vessel responsive to the value indicative of noise within the recorded energy.

23. The non-transitory computer-readable medium of claim 22:
wherein the program causes the processor to read energy in a first time window associated with releasing of interrogating energy; and
wherein when the processor calculates, the program causes the processor to calculate based on a second time window within the first time window, the second time window having a time length between and including 500 milliseconds (ms) and 1000 ms.

24. The non-transitory computer-readable medium of claim 23 wherein when the processor calculates the value indicative of noise, the program causes the processor to, for each frequency of a plurality of frequencies:
determine a value indicative of noise in the remaining portion; and
estimate noise in the signal region based on the value indicate of noise in the remaining portion.

25. The non-transitory computer-readable medium of claim 22 wherein when the processor calculates the value indicative of noise, the program causes the processor to:
for each frequency of a plurality of frequencies, estimate noise energy in the signal region based on noise energy in the remaining portion; and
determine the value indicative of noise across both the signal region and remaining portion.

26. The non-transitory computer-readable medium of claim 22 wherein when the processor changes towing speed, the program causes the processor to at least one selected from the group consisting of: increase the towing speed based on the value indicative of noise being below a predetermined threshold; and decrease the towing speed based on the value indicative of noise being above a predetermined threshold.

* * * * *